July 16, 1929.  A. B. CADMAN  1,720,882
TRAILER CONTROL MECHANISM
Original Filed June 1, 1926    2 Sheets-Sheet 1
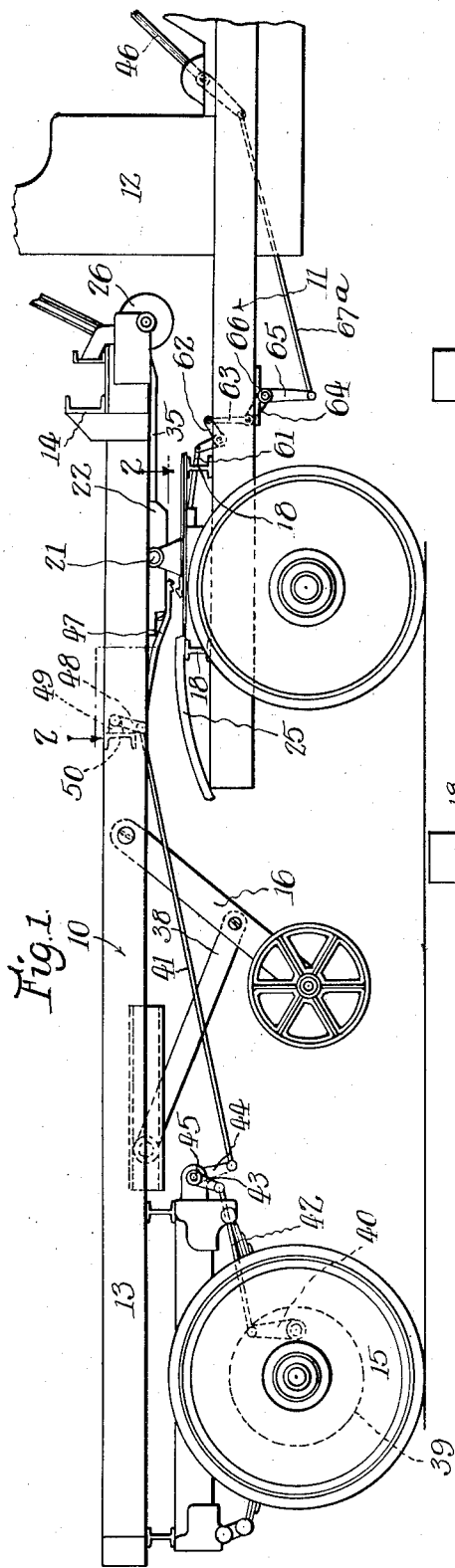
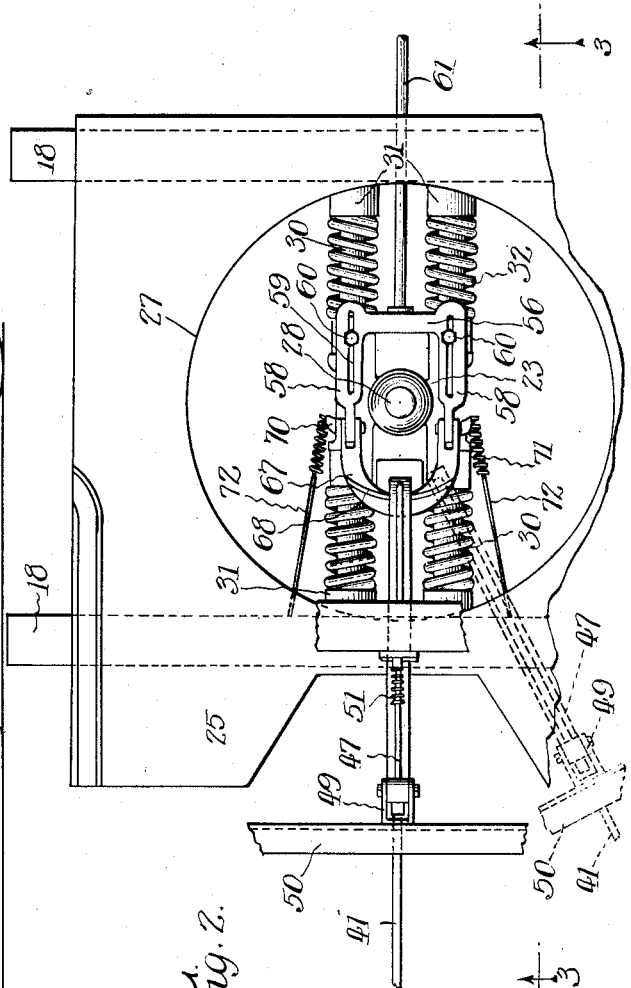
Inventor
Addi B. Cadman,
By Schmidahl, Parker & Carlson
Attys.

Patented July 16, 1929.

1,720,882

UNITED STATES PATENT OFFICE.

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN.

TRAILER-CONTROL MECHANISM.

Application filed June 1, 1926, Serial No. 112,781. Renewed October 3, 1928.

My invention relates to vehicles having tractor and trailer sections, and has more particular reference to a device for controlling the operation of such vehicles.

To operate a trailer mechanism such as the trailer brakes from a point on the tractor of a tractor-trailer vehicle, a connecting linkage leading through the king bolt of the coupling mechanism is usually provided. Such a connection does not interfere with the swiveling or coupling operations of the tractor and trailer but has been found to be unsatisfactory, one reason being that the power necessary to operate a mechanism such as the trailer brakes cannot be transmitted through the king bolt effectively without providing cumbersome and complicated mechanisms. This results from the fact that the portion of the operating linkage extending through the fifth-wheel must be placed under compression instead of tension, and for this reason has a short range of movement.

The primary object of the present invention is to provide a tractor-trailer vehicle having a novel control mechanism for operating a trailer mechanism from a point on the tractor which does not interfere with the swiveling action between the tractor and the trailer nor with the operations of coupling and uncoupling and which at the same time avoids the use of a hollow king bolt.

Another object is to provide a new and improved means for connecting the trailer mechanism to an actuating mechanism on the tractor which means is concealed in the space between the overlapping portions of the tractor and trailer frames and which is arranged to be moved longitudinally of the vehicle whereby the force applied by the actuating mechanism may be transmitted to the trailer in a positive and efficient manner.

In carrying out the foregoing objects, the invention aims to provide two normally disengaged parts, one connected to a trailer mechanism, such as the trailer brakes, and the other to an operating means on the tractor, the part on the tractor being arranged to interengage with the part on the trailer upon the initial movement of said operating means and then to be placed under tension whereby to move said trailer part to actuate the trailer mechanism upon further movement of the operating means.

A further object is to provide a tractor-trailer vehicle having the novel link connection between them by means of which a trailer mechanism can be operated from the tractor regardless of ordinary variations in the angular relation between the tractor and trailer.

Still a further object is to provide a tractor-trailer having a brake control rod on the trailer which is moved into and out of a fixed position relative to the tractor and to the trailer during the coupling and uncoupling operations.

Other objects and advantages will become apparent from the following detailed description of the invention taken in connection with the accompanying drawings in which Fig. 1 is a fragmentary side elevation of a tractor-trailer equipped with a control device embodying features of my invention.

Fig. 2 is a fragmentary view taken substantially along line 2—2 of Fig. 1.

Figure 3:
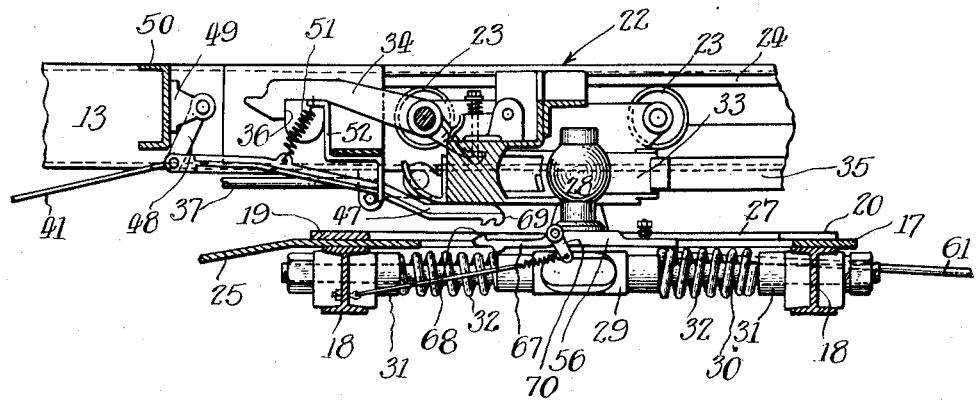
Figs. 3, 4 and 5 are fragmentary sectional views taken along line 3—3 of Fig. 2 and illustrating the different operative positions of the control mechanism.

While I have shown in the drawings and will describe herein one embodiment of my invention, it is to be understood that I do not intend thereby to be limited to the particular form disclosed but aim to cover all modifications and alternative constructions falling within the spirit and scope of the invention as expressed in the appended claims.

The combination vehicle which has been chosen to illustrate the use of the present invention comprises a detachable semi-trailer 10 drawn by an ordinary tractor or truck 11 which may be driven or controlled in the usual way from a cab 12. My improved control device is intended to be used on vehicles of this general type to enable the driver in the tractor cab to operate a mechanism on the trailer at will. In the present instance, the control device is illustrated as a means for applying the trailer brakes in bringing the vehicle to a stop or in holding it on a steep incline. Another application of the invention is illustrated in my co-pending application Serial No. 205,607 filed July 14, 1927.

The chassis of the exemplary trailer comprises a plurality of longitudinal frame bars 13 rigidly connected by cross pieces 14 to form a horizontal platform frame the rear end of which is supported in the usual way from wheels 15. When the vehicle sections are connected for combined operation, the forward end of the trailer overlies and rests upon the rear end of the tractor frame. When the trailer is detached, its forward end is supported by a frame 16 pivoted on the trailer frame and swingable into and out of land-engaging position.

To provide for swiveling action between the tractor and the trailer sections, any preferred fifth-wheel construction may be employed. Herein, the stationary member of the fifth wheel is a flat plate 17 supported on horizontal cross bars 18 on the tractor frame, and the movable member thereof comprises an annular plate 19 mounted on the trailer and having its front portion cut away as indicated at 20. The plate 19 is pivoted to swing about a horizontal axis 21 on a rectangularly-shaped casting 22 hereinafter termed the coupling carriage and mounted to slide back and forth between the inner frame bars 13 during coupling and uncoupling of the tractor and trailer. The weight of the trailer on the carriage is sustained by wheels 23 thereon which roll along the under sides of inturned flanges 24. To transfer the weight of the trailer onto the tractor during coupling, the plate 17 has a downwardly inclined portion 25 which coacts with anti-friction wheels 26 and the swingable plate 19 to raise the forward end of the trailer.

Projecting vertically through an opening 27 in the plate 17 is a king pin 28 by means of which tractive force is applied to the trailer. Preferably, the king pin is formed integral with a casting 29 through which extends two slidable rods 30, having their opposite ends anchored in blocks 31 on the cross bars 18. Relief springs 32 encircling the rods 31 serve to permit yielding fore and aft movement between the tractor and trailer thereby absorbing shocks.

The mechanism for coupling the trailer and tractor comprises two jaws 33 pivoted on the forward end of the coupling carriage 22 for locking the latter to the king pin, and two spring pressed latch hooks 34 pivoted on the rear end of the carriage for locking it in the trailer frame. As the tractor is backed under the trailer during coupling, the king pin enters the socket formed by the jaws 33 which at this time are spread apart. The king pin cams the jaws together and then slides the carriage rearwardly, during which movement each jaw is held closed against the king pin by a stationary bar 35 acting as a cam on the free end of the jaw. At the end of the coupling stroke, the latch hook 34 become engaged behind fixed shoulders 36 on trailer thereby locking the carriage against forward movement.

To detach the trailer, means (not shown) is actuated to release the hooks 34, and then the tractor is pulled away sliding the carriage forwardly. At the end of the forward stroke, the jaws spread apart automatically thereby freeing the king pin. On further movement of the tractor the fifth-wheel plates are separated, the weight of the tractor being transferred to the supporting frame 16 which may be swung into and out of land-engaging position in the movement of the carriage 22. This is accomplished, in the present instance, by connecting the carriage and the frame 16 through the medium of rods 37 and brace bars 38.

Preferably, each of the trailer wheels 15 is equipped with a brake 39 of the well known drum type, which may be set by forward oscillation of a lever 40. Both of the brake levers 40 are operatively connected with a forwardly extending brake rod 41 through rods 42 and cranks 43 and 44 on the shaft 45. With this arrangement, the brakes will be applied whenever the rod 41 is pulled forwardly and will release themselves automatically when the rod is released.

As applied to the present tractor-trailer vehicle, my improved control device comprises generally two interengageable hook members both concealed between the forward end of the trailer frame and the rear end of the tractor, and connected respectively with the brake rod 41 and a hand-operated lever 46 in the tractor cab 12. The parts are normally disengaged so as not to interfere with the coupling operations above described but are arranged to interengage upon the initial movement of the lever 46. Further movement of the hand lever places the two members under tension, thereby pulling the rod 41 forwardly to set the trailer brakes.

One of the members above mentioned comprises a floating rod 47 extending centrally of the trailer and arranged to be raised and lowered into and out of a fixed position above the tractor during the movement of the carriage in the coupling and uncoupling operations. The rear end of the rod is supported by a link 48 pivotally suspended from lugs 49 on a cross-piece 50 of the trailer frame. A tension spring 51 acting between the rod 47 and a bracket 52 tends normally to raise the forward end of the rod. The rod is guided vertically by arms 53 depending from the bracket 52.

Figure 4:
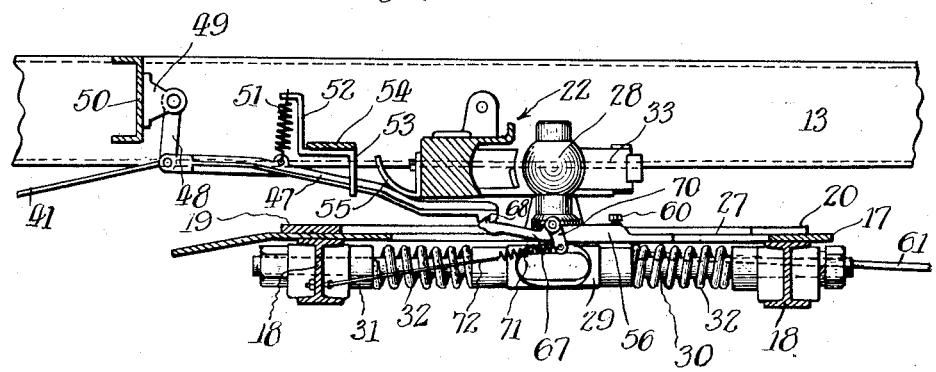
Figure 5:
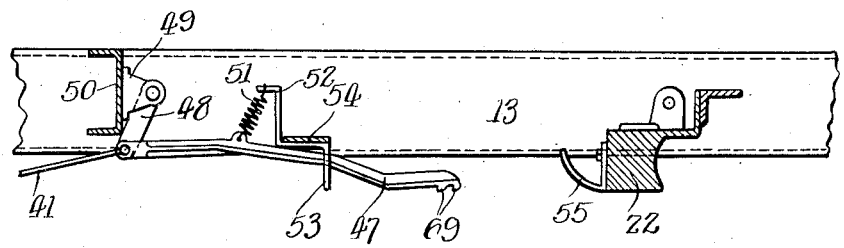

When the trailer is detached, the rod 47 is held upwardly against the cross piece 54 (see Fig. 5) with its free end disposed in the path of the coupling carriage 22. As the carriage is moved rearwardly during coupling, an inclined projection 55 thereon will strike the rod 47 and depress it into the position shown in Figs. 3 and 4. In this way the floating rod will be held in an out-of-the-way position when the trailer is detached and moved into a fixed operating position during coupling, such fixed position being determined by the guide arms 53, the carriage 22, and the link 48 which are normally held against the cross-piece 50 by the tension of the brakes.

Mounted to slide horizontally upon the rear end of the tractor is an actuator slide 56 which, in the present instance, is U-shaped in form with legs 58 projecting rearwardly on opposite sides of the king pin 28. Each leg 58 rests upon the upper surface of the casting 23 and has a longitudinal slot 59 therein through which extends a bolt 60 threaded into the casting and serving to guide the slide as it moves forwardly and rearwardly. Preferably, the length of the slots 59 is such that in the forward or normally inactive position, the bolts 60 are positioned a short distance from the forward ends of the slots. Such arrangement allows for a limited forward movement of the bolts so that the slide 56 will not be moved forwardly whenever the trailer tends to override the tractor in descending an incline.

Connected to the medial portion of the slide 56 is a rod 61 which is in turn joined to the hand lever 46, through a suitable linkage comprising herein a crank 62, a rod 63, cranks 64 and 65 on a shaft 66, and a rod 67ª. Preferably, these elements are arranged so that a force acting in a substantially horizontal plane will be applied to the slide as the lever 46 is moved back and forth.

The other hook member above mentioned is indicated by the numeral 67 and is carried by the slide 56 and arranged to be swung upwardly into engagement with the rod 47 upon movement of the slide forwardly. In the present instance, it also is U-shaped in form, having forwardly extending legs each pivoted on one of the legs 58 of the slide. Normally the curved medial portion of the member 67 rests in horizontal position upon the king pin mounting 29. A curved shoulder 68 of substantial length is formed on the upper surface of the member 67 in position to interengage with one of several teeth 69 depending from the floating rod 47. Preferably, the center of curvature of the shoulder 68 is normally at the center of the king pin 28 so that the shoulder will interengage with one of the teeth 69 when the trailer is out of alinement with the tractor as when the vehicle is rounding a corner. The relation of the parts under such conditions is shown in dotted outline in Fig. 2.

Rigid with each leg of the hook 67 is a depending crank arm 70 the end of which is connected to the rear cross bar 18 of the tractor by a spring 71 and a rod 72. The rod is adjusted so that the tension in the spring will not overcome the weight of the hook 67 when the slide is in its normal or rearward position. As the slide is pulled forwardly by the hand lever 46, the springs 71 will be extended and the tension created thereby acting on the crank arms 70 will swing the hook upwardly into engagement with the teeth of the floating rod 47. A connection will thus be established between the hand lever 46 and the rod 47, and further movement of the slide forwardly will pull the rod 41 forwardly to set the trailer brakes. During this latter movement, the springs 71 are further extended and firmly hold the hook 67 in engagement with the teeth of the rod 47. Since the hook 67 does not move the rod 47 forwardly upon the initial movement of the lever 46, the hook provides what may be called a disengageable lost-motion connection between the brakes and the hand lever 46.

To release the brakes, the driver in the cab releases the lever 46 and moves it forwardly thereby moving the slide 56 into its rearward or inactive position. Such movement permits the brakes to release themselves and thereby to move the rod 47 rearwardly. When the slide reaches its rearward position, the tension of the springs 71 will have decreased sufficiently to permit the hook 67 to fall back into normal position out of engagement with the rod 47.

The present device may be used as an automatic means for tightening the trailer brakes after they have been set by the hand operated lever 46. To this end, the slots 59 in the slide 56 may be made of such length that the bolts 60 will be positioned at the rear ends of slots after the slide has been moved into its foremost or active position to set the brakes. Setting of the brakes causes the trailer to drag back of the tractor, thereby separating it from the tractor as permitted by the rear relief springs 32 then under compression. Since at this time the hook 67 is stationary relative to the tractor and in engagement with the rod 47, such dragging back of the trailer will cause the rod 47 to be pulled forwardly, thereby tightening the trailer brakes so as to further assist in stopping the vehicle. Such tightening action may, however, only be momentary inasmuch as the tractor brakes are usually applied about the same time as the trailer brakes.

The control device thus provided is simple in construction and positive in operation, and is adapted to transmit power from the tractor to the trailer positively and efficiently regardless of ordinary variations in angular relationship. All of the parts are concealed between the tractor and trailer frames and mounted so as not to interfere with each other or with other parts of the tractor or trailer mechanisms during combined operation of the tractor and trailer or during coupling and uncoupling.

The coupling mechanism and the fifth-wheel structure herein disclosed form the subject matter of and are generically claimed in my co-pending applications Serial No. 661,376, filed September 7, 1923 and Serial No. 92,428, filed March 5, 1926.

I claim as my invention:

1. A vehicle comprising, in combination, a tractor, a trailer coupled to the tractor, trailer brakes, a brake rod connected to said brakes and extending centrally of the trailer frame, the forward end of said rod having depending hook teeth, a slide mounted centrally of the tractor for horizontal movement, a hand lever in the tractor cab for actuating said slide, a hook member pivoted on said slide beneath the teeth of said rod, and normally inactive means operable to swing said member upwardly as said slide is moved in one direction.

2. A vehicle comprising, in combination, a tractor, a trailer adapted to be connected to the tractor, trailer brakes, a brake operating rod having a hooked end located near the forward end of the trailer, a hook slidably mounted on the tractor and adapted to be moved into engagement with the hooked end of said rod, said hook and rod being normally disengaged when the tractor and trailer are connected together, means operable to slide said hook, and yieldable means operable during the initial movement of said slide to move said hook into engagement with said rod.

3. A vehicle comprising, in combination, a tractor section, a trailer section adapted to be coupled to the tractor section, trailer brakes, a rod extending centrally of the trailer and operatively associated with said brakes, said rod having a hooked forward end, a slide mounted on the tractor, manual means operable to actuate said slide, a hook pivoted on said slide adjacent said rod, and means rendered active by movement of said slide in in one direction to swing said hook into engagement with the hooked end of said rod.

4. The combination with a tractor and trailer, of brakes for the trailer, a rod connected to said brakes, a member movably mounted on the tractor, and a hook carried by said member and arranged to be placed under tension upon the movement of said member in one direction to engage said rod and then move it in a direction to set said brakes.

5. The combination with a tractor and trailer, of brakes for the trailer, actuating means connected to said brakes and including a hook located near the forward end of the trailer, a member mounted on the rear end of the tractor and arranged for pivotal movement whereby to engage said hook and for movement longitudinally of the tractor whereby to move said hook in a direction to set said brakes, manually operable means for moving said member longitudinally, and means actuated by longitudinal movement of said member for pivoting the member.

6. The combination with a tractor and trailer, of means for coupling said tractor and trailer together including a vertical king bolt, two U-shaped members on the tractor pivotally connected at their open ends and encircling said king bolt, brakes on the trailer, a brake rod connected to said brakes and positioned for engagement with one of said members, and manual operable brake setting means connected with said other member.

7. The combination with a tractor and trailer, of means for coupling said tractor and trailer together including a vertical king bolt, two U-shaped members on the tractor pivotally connected at their open ends and encircling said king bolt, brakes on the trailer, a brake rod connected to said brakes and positioned for engagement with one of said members, manually operable brake-setting means connected with said other member, and means operating during the initial movement of said setting means to swing said first mentioned member into holding engagement with said rod.

8. The combination with a tractor and trailer, of coupling means connecting said tractor and trailer for relative pivotal movement about a central vertical axis, brakes for the trailer, a brake rod connected to said brakes and extending centrally of the trailer frame, the forward end of said rod having a depending hooked portion, a hook member mounted on the tractor beneath the hooked portion of said rod, said member being arranged for horizontal and vertical movement, manually operable means for moving said member horizontally, and means controlled by said manual operable means for moving said member vertically.

9. The combination with a tractor and trailer of means for coupling the tractor and trailer together including a vertical king bolt, trailer brakes, an actuating rod connected with said brakes and having a hooked end positioned adjacent said king bolt, a U-shaped member on the tractor having its legs disposed on opposite sides of said king bolt and its closed end disposed beneath the hooked portion of said rod, said member having a curved upstanding shoulder forming a hook adapted for engagement with said hooked end in different angular positions of the tractor and trailer, and means operable to move said hook whereby to operate said rod.

10. The combination with a tractor and trailer, of means for coupling the tractor and trailer together including a vertical king bolt, brakes for the trailer, a rod connected to said brakes, actuating means on the tractor, two U-shaped members on the tractor encircling said king bolt and having their opposite ends pivotally joined, one of said members being connected with said actuating means and the other adapted for engagement with said rod.

11. The combination with a tractor and trailer connected for swiveling about a vertical axis, of brakes for the trailer, an actuator rod operably connected to said brakes and having a hooked portion positioned above the tractor, a member mounted on the tractor for longitudinal movement in a line intersecting said vertical axis, said member having a curved shoulder for engaging the hooked portion of said rod in different angular positions of the tractor and trailer, and means to actuate said member.

12. The combination of a tractor and trailer, of means for coupling said tractor and trailer for swiveling about a vertical axis, brakes on the trailer, a rod for actuating said brakes, said rod having its forward end positioned above the tractor when the trailer and tractor are coupled together, a member mounted on the tractor and having a curved shoulder for engaging said rod in different angular positions of the tractor and trailer, the center of curvature of said shoulder being said vertical axis, and means operable to move said member longitudinally of the tractor.

13. The combination with a tractor and trailer, of brakes for the trailer, a brake actuating member, means operable upon relative movement between the tractor and trailer during coupling and uncoupling to move said member into and out of a fixed position relative to said trailer, and means on the tractor adapted for engagement with said member when in such fixed position, and actuating means for the last mentioned means.

14. The combination with a tractor and trailer, of brakes for the trailer, a floating brake rod connected to said brakes and adapted for movement longitudinally of the trailer to set said brakes, said rod also being adapted for vertical movement into and out of a fixed position, means operable during coupling of the tractor and trailer for moving said rod into said fixed position, and brake-setting means on the tractor adapted for engagement with said rod when in its fixed position.

15. The combination with a tractor and trailer of brakes for the trailer, a link pivotally suspended from the trailer frame and connected to said brakes, a forwardly extending rod pivoted at its rear end on said link, yielding means acting on said rod to move it in one direction, means actuated by relative movement between the tractor and trailer during coupling to move said rod into a fixed position against the action of said yielding means, and brake-setting means on the tractor adapted for engagement with said rod when in its fixed position.

16. The combination with a tractor and trailer, of brakes for the trailer, a rod connected to said brakes and arranged for movement longitudinally of the trailer whereby to set and release said brakes, means limiting the rearward movement of said rod, a member on the tractor adapted for engagement with said rod, means operable upon coupling of the tractor and trailer to move said rod into a position to be engaged by said member.

17. The combination with a tractor and trailer, of a mechanism on the trailer to be operated, actuating means for said mechanism located near the forward end of said trailer, a member mounted on the tractor beneath said actuating means, said member being mounted for vertical movement to engage said actuating means and for horizontal movement to operate said actuating means, hand operated means on the tractor for moving said member horizontally, and means controlled by said hand operated means for moving said member vertically.

18. The combination with a tractor and trailer, of a mechanism on the trailer to be operated, actuating means for said mechanism located near the forward end of the trailer, a member on said tractor mounted for movement in one direction to engage said actuating means and in another direction to operate said actuating means, means on the tractor operable to move said member in a direction to operate said actuating means, and means operable upon the initial movement of said power means to move said member in a direction to engage said actuating means.

19. The combination with a tractor and trailer of brakes for the trailer, operating means therefor on the tractor, and means for connecting said brakes and operating means comprising two normally disengaged members positioned between the overlapping portions of the tractor and trailer and adapted for movement longitudinally of the space between said portions, one of said members being mounted on a trailer and connected to said brakes and the other being mounted on the tractor and connected to said operating means, and means acting on said tractor member and operable upon the initial movement of said operating means to move the tractor member into engagement with the trailer member.

20. The combination with a tractor and trailer, of a mechanism on the trailer to be operated, actuating means therefor on the tractor, a part mounted on the forward end of the trailer and connected to said mechanism, a part mounted on the rear end of the tractor and connected to said actuating means, said parts being normally disengaged when the tractor and trailer are coupled together, and spring means rendered operable in the initial movement of said actuating means to move said last mentioned part into engagement with the said first mentioned part.

21. The combination with the tractor and trailer, of a mechanism on the trailer, operating means therefor on the tractor, a part mounted near the forward end of the trailer and connected to said mechanism, a part mounted on the rear end of the tractor for movement longitudinally thereof and connected to said operating means, said parts being brought into operative relation during coupling of the tractor and trailer, and means actuated by said operating means to move the tractor part into engagement with the trailer part.

22. The combination with a tractor and trailer, of a trailer brake mechanism, operating means therefor on the tractor, means providing a normally disengaged link connection between said mechanism and said operating means which will permit detachment of the trailer at will, and means controlled by said operating means in the initial movement to establish the connection between said operating means and said brake rod.

23. The combination with a tractor and trailer, of an operative mechanism on the trailer, a hook on the trailer operatively associated with said mechanism, a hook on the tractor positioned for engagement with said trailer hook when the trailer is connected to the tractor, and manually controlled mechanism on the tractor operable on movement in one direction to move said tractor hook into engagement with said trailer hook and then to move said trailer hook in a direction to actuate said mechanism.

24. The combination with a tractor and trailer, of brakes for the trailer, operating means therefor on the tractor, two brake control members, one connected to said brakes and the other to said operating means, said members being normally disengaged when the tractor and trailer are coupled together, and spring means acting on said tractor member and operable to move it into engagement with said trailer member, said spring means being rendered active in the initial movement of said operating means.

25. The combination with a tractor and trailer, of brakes for the trailer, manual operable means therefor on the tractor, a plurality of links providing a normally disengaged connection between said brakes and said operating means, part of said connection being movable longitudinally in the space between the overlapping portions of the tractor and trailer, and means controlled by the initial movement of said operating means for completing said connection.

26. The combination with a tractor and trailer, of brakes for the trailer, brake-setting means operable from the tractor, a plurailty of links providing a normally disengaged connection between the brakes and said operating means, and a spring acting on one of said links and operable to move it in a direction to complete said connection.

27. The combination with a tractor and trailer, of brakes for the trailer, a member on the trailer connected to said brakes, a tractor member normally disengaged from said trailer member when the tractor and trailer are coupled together, and means on the tractor for moving said tractor member into hooked engagement with said trailer member to permit setting of said brakes from a point on the tractor by placing said last mentioned means under tension.

28. The combination with a tractor and trailer, of a mechanism on the trailer to be operated and means providing a normally disengaged lost-motion connection between said mechanism and said operating means.

29. The combination with a tractor and trailer, of a mechanism on the trailer to be operated, actuating means therefor on the tractor, and means responsive to the initial movement of said actuating means to establish a link connection between said mechanism and said actuating means, said last mentioned means being placed under tension in the continued movement of said actuating means.

30. The combination with a tractor and trailer, of a trailer mechanism, operating means therefor on the tractor, a plurality of members providing a normally disengaged link connection between said mechanism and operating means, and yielding means operable to complete said connection and maintain it during operation of said mechanism by said operating means, said yielding means being rendered active in the initial movement of said operating means.

31. In a combined vehicle comprising a tractor and a semi-trailer adapted to be connected for combined operation and disconnected for independent operation, the combination of a mechanism on the trailer to be operated, a mechanical connection extending from said mechanism to an operating point on the tractor, said connection including two inter-engageable hook members mounted respectively on the tractor and trailer and normally disengaged when the tractor and trailer are connected together whereby to permit detachment of the tractor from the trailer, and actuating means on the tractor operable upon continued movement in one direction to cause engagement between said members and then to place the members under tension whereby to actuate said mechanism.

32. In a combined vehicle comprising a tractor and a semi-trailer adapted to be connected for combined operation and disconnected for independent operation, the combination of mechanism on the trailer to be operated, operating means therefor on the tractor, and means adapted to provide a mechanical connection between said mechanism and said operating means which will permit of detachment of the tractor from the trailer, said connection being composed of a tractor portion connected to said operating means and a trailer portion connected to said mechanism, the terminal members of said portions being positioned adjacent each other for inter-engagement when the tractor and trailer are coupled together and arranged to be placed under tension in the actuation of said operating means.

33. In a combined vehicle comprising a tractor and a semi-trailer adapted to be connected for combined operation and disconnected for independent operation, the combination of a mechanism on the trailer to be operated, a mechanical connection extending from said mechanism to an operating point on the tractor, said connection including two inter-engageable elements mounted respectively on the tractor and trailer for horizontal movement in the space between the overlapping portions of the tractor and trailer frames, said elements being normally disengaged so as to permit detachment of the tractor from the trailer, and means on the tractor by which said tractor element may be actuated so as to operate said trailer element.

34. In a combined tractor trailer vehicle, a means for operating a trailer mechanism from a point on the tractor characterized by having two interengageable members, one on the trailer associated with said mechanism, the other being mounted on the tractor for movement in one direction to engage said trailer member and in another direction to actuate the trailer member.

35. In a combined tractor trailer vehicle, a means for operating a trailer mechanism from a point on the tractor characterized by having two interengageable members, one on the trailer associated with said mechanism, the other being mounted on the tractor for movement in one direction to engage said trailer member and in another direction to actuate the trailer member, and spring means for causing said engaging movement.

36. A combined vehicle of the character described comprising, in combination, a tractor, a trailer, means for coupling the tractor and trailer together for swiveling about a common axis, a mechanism on the trailer to be operated, actuating means therefor on the tractor, and means providing a normally disengaged connection between said mechanism and said actuating means including a member movably mounted on the tractor and extending around said axis.

In testimony whereof, I have hereunto affixed my signature.

ADDI BENJAMIN CADMAN.